U S011632610B2

(12) United States Patent
Wu et al.

(10) Patent No.: US 11,632,610 B2
(45) Date of Patent: Apr. 18, 2023

(54) SPEAKER MODULE AND PROJECTION DEVICE

(71) Applicant: Coretronic Corporation, Hsin-Chu (TW)

(72) Inventors: Chao-Kuan Wu, Hsin-Chu (TW); Wei-Ping Lin, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/223,020

(22) Filed: Apr. 6, 2021

(65) Prior Publication Data
US 2021/0321181 A1 Oct. 14, 2021

(30) Foreign Application Priority Data

Apr. 10, 2020 (CN) .......................... 202020515960.2
Sep. 16, 2020 (CN) .......................... 202022024480.9

(51) Int. Cl.
*H04R 1/02* (2006.01)
*G03B 21/14* (2006.01)
(52) U.S. Cl.
CPC ........... *H04R 1/025* (2013.01); *G03B 21/145* (2013.01); *H04R 1/026* (2013.01); *H04R 1/028* (2013.01)

(58) Field of Classification Search
CPC ........ H04R 1/025; H04R 1/026; H04R 1/028; G03B 21/145
See application file for complete search history.

(56) References Cited

U.S. PATENT DOCUMENTS 5,806,950 A * 9/1998 Gale ...................... G03B 21/10
348/E5.145

FOREIGN PATENT DOCUMENTS

TW M484271 U 8/2014

OTHER PUBLICATIONS

Translation of TWM484271U, Yuxia, Aug. 11, 2014.*

* cited by examiner

*Primary Examiner* — Andrew L Sniezek

(57) ABSTRACT

A speaker module includes a base, a speaker and a wire. The base has a bottom and a first wire fixing portion. The speaker is disposed in the base and has a second wire fixing portion. The wire is fixed to the first wire fixing portion and the second wire fixing portion to suspend the speaker in the base, and the speaker is separated from the bottom with a distance. A projection device having the speaker module is further provided.

20 Claims, 7 Drawing Sheets

SPEAKER MODULE AND PROJECTION DEVICE

CROSS-REFERENCE TO RELATED APPLICATION

This application claims the priority benefit of China application 202020515960.2, filed on 2020 Apr. 10 and China application 202022024480.9, filed on 2020 Sep. 16. The entirety of the above-mentioned patent applications is hereby incorporated by reference herein and made a part of this specification.

FIELD OF THE INVENTION

The invention relates to an acoustic module, and more particularly to a speaker module and a projection device with the speaker module.

BACKGROUND OF THE INVENTION

Generally speaking, a projector needs to be equipped with at least one speaker, and these speakers need to be locked by at least three to four screws, and are equipped with a rubber damper for shock absorption. However, the screw used to lock the speaker may be a special screw, which has a higher price, resulting in a higher product cost. In addition, different shapes of speakers or fixed bases need to use different rubber dampers, making the rubber dampers less versatile. Since the speaker vibrates during operation, the rubber damper disposed between the speaker and the fixed base may be deformed, which may affect the shock absorption effect of the rubber damper, resulting in noise and lowering the sound quality of the speaker.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The invention provides a speaker module with low manufacturing cost and good tone quality.

The invention provides a projection device including the above-mentioned speaker module, and the projection device has the advantages of low cost and good tone quality.

Other advantages and objects of the invention may be further illustrated by the technical features broadly embodied and described as follows.

In order to achieve one or a portion of or all of the objects or other objects, a speaker module provided in an embodiment of the invention includes a base, a speaker and a wire. The base has a bottom and a first wire fixing portion. The speaker is disposed in the base and has a second wire fixing portion. The wire is fixed to the first wire fixing portion and the second wire fixing portion to suspend the speaker in the base, and the speaker is separated from the bottom with a distance.

In order to achieve one or a portion of or all of the objects or other objects, a projection device provided in an embodiment of the invention includes an illumination system, a light valve, a projection lens, a speaker module and a housing. The illumination system is adapted to provide an illumination beam. The light valve is disposed on a transmission path of the illumination beam to convert the illumination beam into an image beam. The projection lens is disposed on a transmission path of the image beam. The speaker module includes a base, a speaker and a wire. The base has a bottom and a first wire fixing portion. The speaker is disposed in the base and has a second wire fixing portion. The wire is fixed to the first wire fixing portion and the second wire fixing portion to suspend the speaker in the base, and the speaker is separated from the bottom with a distance. The housing accommodates the illumination system, the light valve, the projection lens and the speaker module.

In the speaker module of the invention, the wires are used to replace screws and rubber dampers to position the speaker, so the manufacturing cost may be effectively reduced. Since the speaker is suspended in the base by the wires, the speaker module has better shock absorption effect, and the speaker is not easy to deform the base, so the tone quality of the speaker module may be improved. The projection device of the invention uses the above-mentioned speaker module, so it has the advantages of low cost and good tone quality.

Other objectives, features and advantages of The invention will be further understood from the further technological features disclosed by the embodiments of The invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described.

The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces", and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1A:
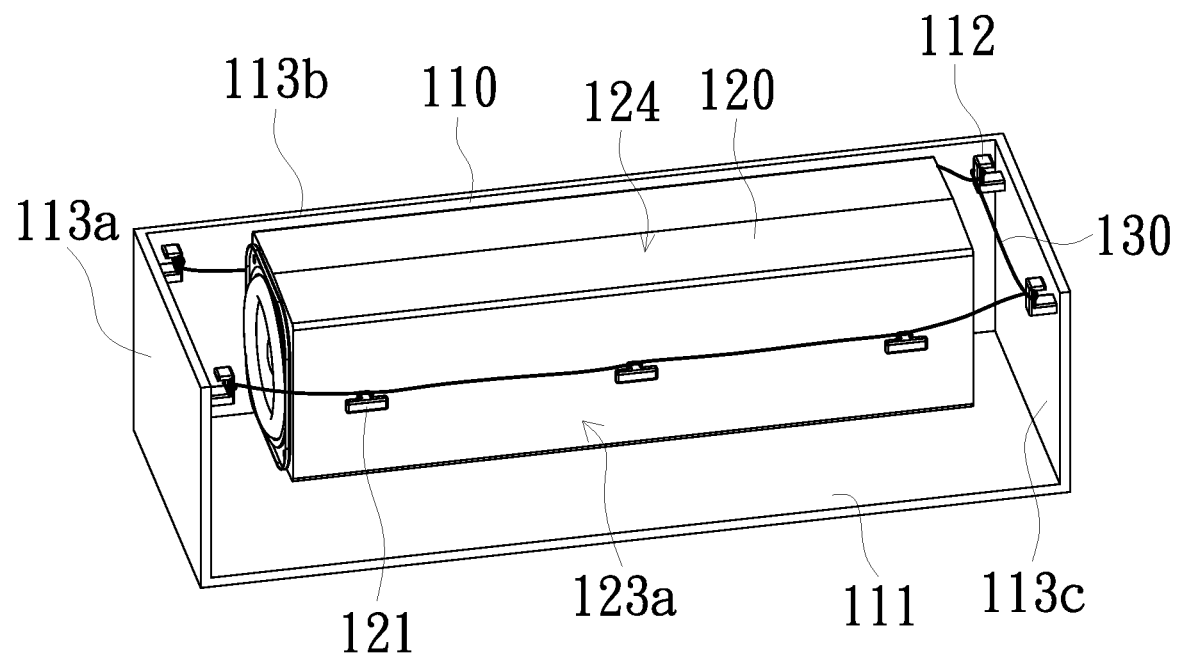
FIG. 1A is a schematic diagram of a speaker module of one embodiment of the invention.

FIG. 1A is a schematic diagram of a speaker module of one embodiment of the invention. Referring to FIG. 1A, speaker module 100 includes a base 110, a speaker 120 and a wire 130. The base 110 has a bottom 111 and a first wire fixing portion 112. The speaker 120 is disposed in the base 110 and has a second wire fixing portion 121. The wire 130 is fixed to the first wire fixing portion 112 and the second wire fixing portion 121 to suspend the speaker 120 in the base 110, and the speaker 120 is separated from the bottom 111 with a distance. It should be noted that the quantity of the first wire fixing portion 112 and the second wire fixing portion 121 may be one or more, the embodiment of FIG. 1A only takes a plurality of first wire fixing portions 112 and a plurality of second wire fixing portions 121 as examples, but it is not limited thereto.

In one embodiment, the wire 130 is fixed to the first wire fixing portion 112 and the second wire fixing portion 121 by winding, binding or clamping, for example, but it is not limited thereto. Since the wire 130 is used to support the speaker 120 and provide a shock absorption buffering effect, the wire 130 needs to have appropriate toughness. Specifically, when the speaker 120 vibrates, the wire 130 rubs against the first wire fixing portion 112 and the second wire fixing portion 121. Therefore, the wire 130 also needs an appropriate degree of wear resistance. Optionally, the wire 130 may also have fire resistance, for example, a material that has passed 94UL fire protection certification may be selected, but is not limited thereto. Specifically, a material of the wire 130 includes, for example, thermoplastic polyurethane (TPU), nylon, carbon fiber, polyethylene (PE), or metal, but is not limited thereto. In other embodiments, the wire 130 has an appropriate wire diameter. In detail, the thicker the wire 130, the better the toughness and wear resistance. However, the wire 130 having an excessively large diameter causes the wire 130 is not easily wound (or bundled and clamped) to the first wire fixing portion 112 and the second wire fixing portion 121. In one embodiment, nylon wire with a diameter of 0.2 millimeters (mm) or more may be used as the wire 130, but it is not limited thereto.

In one embodiment, the first wire fixing portion 112 may be disposed at a plurality of positions on the base 110. For example, the base 110 may include a bottom 111 and at least one side wall, for example, side walls 113a, 113b, 113c. The first wire fixing portion 112 may be fixed on the bottom 111 or the at least one side walls 113a, 113b or 113c of the base 110. Taking FIG. 1A as an example, the first wire fixing portion 112 is connected and fixed to the opposite two of the side walls 113a, 113b, and 113c of the base 110, that is, the first wire fixing portion 112 is disposed on two side walls 113a and 113c facing each other. In a further embodiment, the quantity and position of the first wire fixing portion 112 on the side wall 113a and the first wire fixing portion 112 on the side wall 113c may correspond to each other, but is not limited thereto. In other embodiments, the base 110 may further include another side wall (not shown) facing the side wall 113b and connected between the side walls 113a and 113c. Moreover, the first wire fixing portion 112 can also be disposed on the side wall 113b and the other side wall that not shown. In another embodiment, the first wire fixing portion 112 may also be fixed to a connection between adjacent two of the side walls 113a, 113b, and 113c of the base 110. In other words, the first wire fixing portion 112 may be disposed at a connection between the side walls 113a and 113b, and/or at a connection between the side walls 113b and 113c, respectively. In one embodiment, a material of the first wire fixing portion 112 includes metal, but is not limited thereto. The materials of the first wire fixing portion 112 and the base 110 may be the same or different.

Figure 1B:
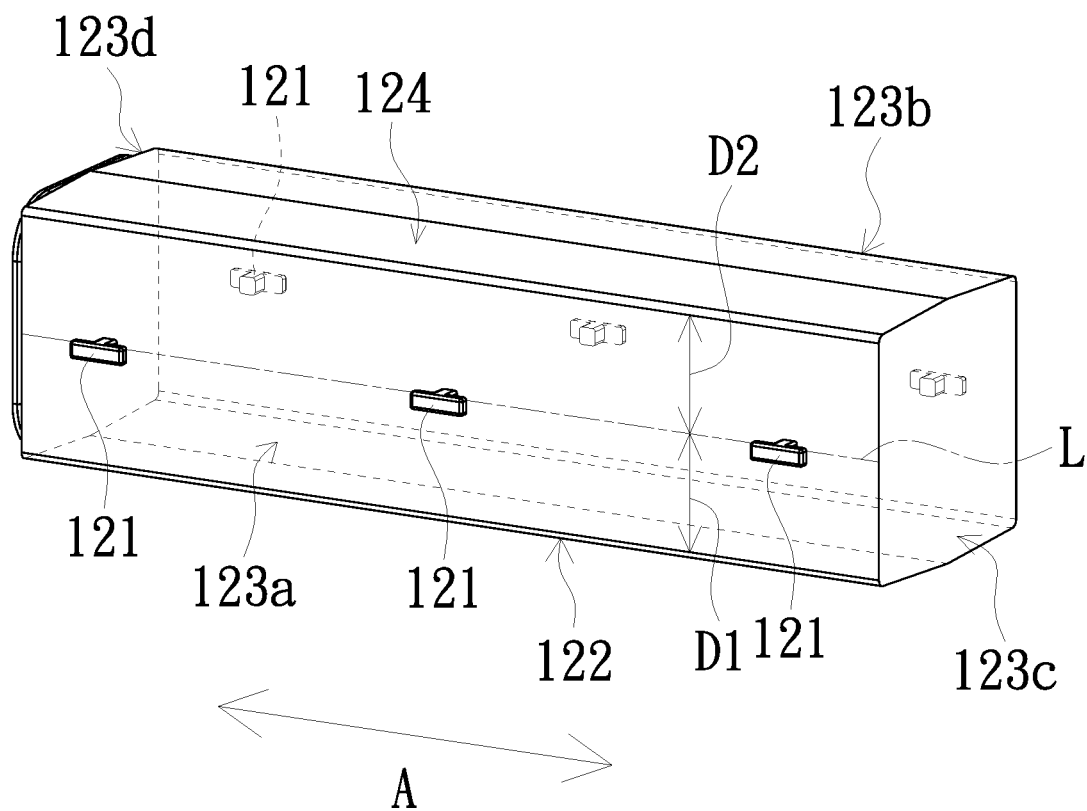
FIG. 1B is a schematic diagram of a speaker of FIG. 1A.

In one embodiment, the second wire fixing portion 121 may be disposed at a plurality of positions of the speaker 120. Specifically, the plurality of second wire fixing portions 121 may be symmetrically distributed with respect to the center of gravity of the speaker 120 so that the speaker 120 may be suspended in the base 110 in a balanced manner. Taking FIG. 1B as an example, FIG. 1B is a schematic diagram of a speaker 120 of FIG. 1A. Referring to FIG. 1A and FIG. 1B, the speaker 120 includes a bottom surface 122 and at least one side surfaces, such as side surfaces 123a, 123b, 123c, and 123d. The bottom surface 122 of the speaker 120 faces the bottom 111 of the base 110. The side surfaces 123a, 123b, 123c, and 123d of the speaker 120 are connected to an edge of the bottom surface 122, and the second wire fixing portion 121 is disposed on at least one of the side surfaces 123a, 123b, 123c, and 123d. For example, the speaker 120 of FIG. 1B has four side surfaces 123a, 123b, 123c, and 123d, where the side surface 123a are opposite to the side surface 123b, and the side surface 123c are opposite to the side surface 123d. The second wire fixing portion 121 is disposed on the side surfaces 123a and 123b, for example, and the quantity of the second wire fixing portions 121 on the side surface 123a and the quantity of the second wire fixing portions 121 on the side surface 123b are the same, and the positions are opposite to each other. Specifically, in the embodiment, the quantity of the second wire fixing portions 121 is, for example, at least two, and the second wire fixing portions 121 may be respectively disposed on opposite two of the side surfaces 123a, 123b, 123c, and 123d. For example, as shown in FIG. 1B, the quantity of the second wire fixing portions 121 is six, three of which are disposed on the side surface 123a, and the other three are disposed on the side surface 123b. However, in other embodiments, the second wire fixing portions 121 may also be disposed on the opposite two side surfaces 123c and 123d, or on a top surface 124 and the bottom surface 122, respectively. The invention is not limited to the quantity and position of the second wire fixing portions 121 shown in FIG. 1B.

In one embodiment, a distance D1 between the second wire fixing portion 121 and the bottom surface 122 of the speaker 120 is equal to a distance D2 between the second wire fixing portion 121 and the top surface 124 of the speaker 120. In short, the second wire fixing portion 121 may be disposed on a center line L of the side surface 123a and/or the side surface 123b, and the center line L may be parallel to an extension axis A of the speaker 120, but is not limited thereto. It should be noted that in FIG. 1B, the three second wire fixing portions 121 may be disposed at equal intervals from each other, however, the second wire fixing portions 121 may also be disposed at non-equidistant intervals. The invention does not limit the interval between the second wire fixing portions 121. It may be understood that since the speaker 120 is suspended in the base 110 by the wire 130, the distance between the second wire fixing portion 121 and the bottom 111 of the base 110 is shorter than the distance between the first wire fixing portion 112 and the bottom 111 of the base 110, but the invention is not limited thereto.

Compared with the prior art, in the speaker module 100 of the embodiment, the wire 130 is used to suspend the speaker 120 in the base 110 to avoid the use of screws, thereby effectively reducing the manufacturing cost. In addition, since the wire 130 has a buffering function, and the speaker 120 and the base 110 are not in contact with each other, the wire 130 of the embodiment may provide a more stable shock absorption effect than the rubber damper of the prior art.

Figure 2A:
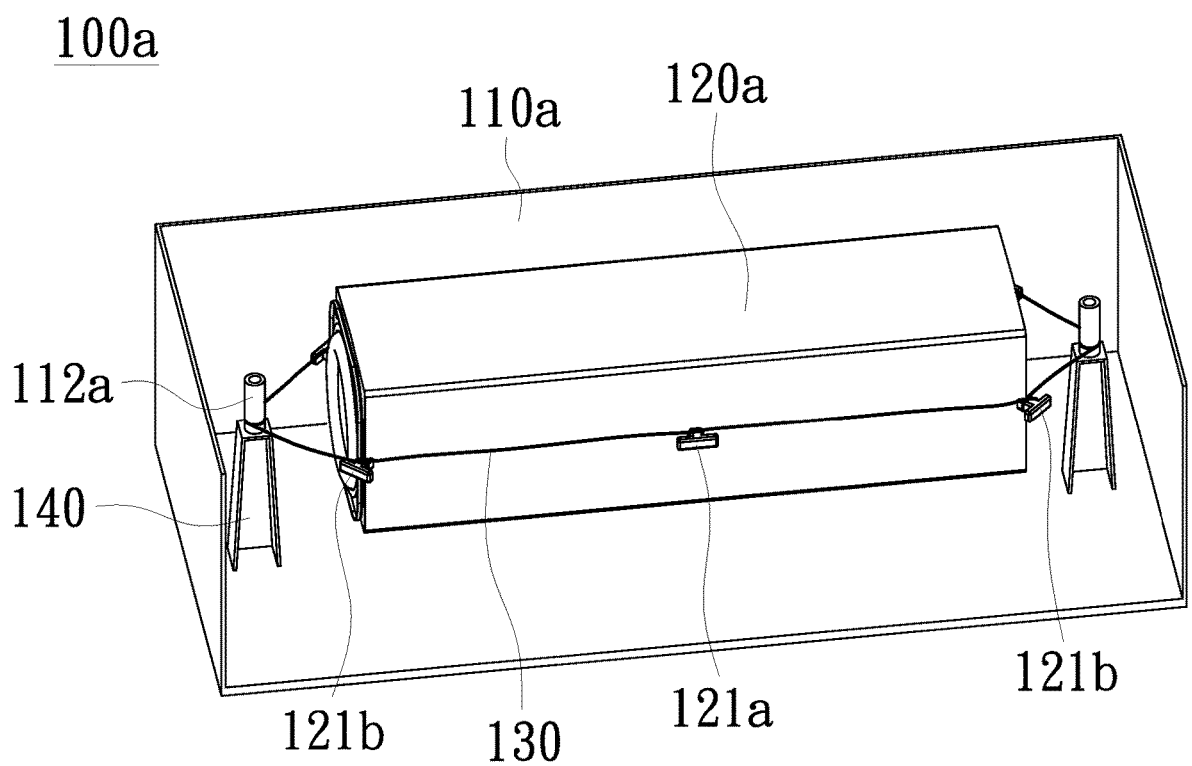
FIG. 2A is a schematic diagram of a speaker module of another embodiment of the invention.

FIG. 2A is a schematic diagram of a speaker module of another embodiment of the invention. The speaker module 100a of the embodiment is similar in structure and advantages to the speaker module 100, and only the main differences in the structure will be described below. Referring to FIG. 2A, the speaker module 100a of the embodiment includes a columnar structure 140. The columnar structure 140 is disposed on a bottom of the base 110a, and the first wire fixing portion 112a may be disposed on a top of the columnar structure 140. For example, the first wire fixing portion 112a may have a column shape, and the wire 130 may be wound to the column-shaped first wire fixing portion 112a. In addition, at a connection between the first wire fixing portion 112a and the columnar structure 140, a radial area of the columnar structure 140 may be larger than a radial area of the first wire fixing portion 112a, so that the columnar structure 140 may be used as a stopper to limit the wire 130 to the first wire fixing portion 112a and prevent it from slipping.

Figure 2B:
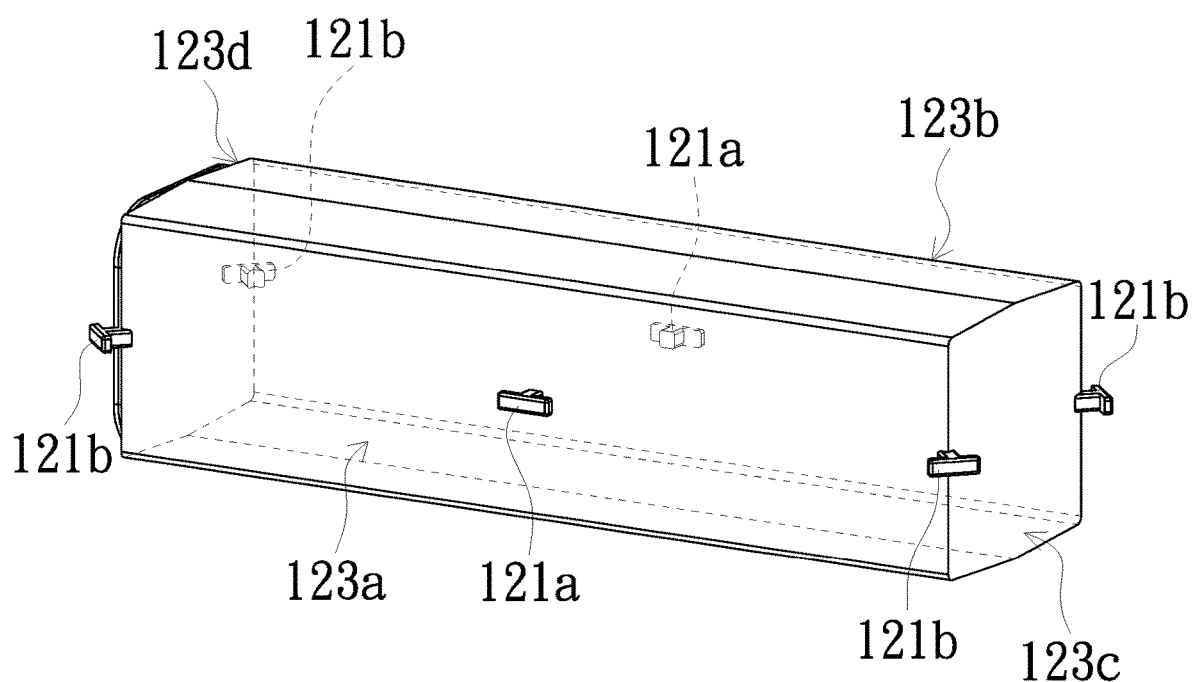
FIG. 2B is a schematic diagram of a speaker of FIG. 2A.

To illustrate the speaker 120a of the embodiment of FIG. 2A, please refer to FIG. 2A and FIG. 2B, wherein FIG. 2B is a schematic diagram of a speaker of FIG. 2A. As shown in FIG. 2B, the speaker 120a includes the second wire fixing portions 121a, 121b, wherein the second wire fixing portion 121b may be disposed at a connection between two adjacent side surfaces 123a, 123b, 123c, 123d. For example, the quantity of the second wire fixing portion 121b is four, the four second wire fixing portions 121b may be provided at the connection of the side surfaces 123a and 123d, the connection of the side surfaces 123a and 123c, the connection of the side surfaces 123c and 123b, and the connection of the side surfaces 123b and 123d, but not limited thereto. On the other hand, the quantity of the second wire fixing portion 121a is, for example, two, and they are respectively provided at the middle of the side surface 123a and the middle of the side surface 123b. Taking FIG. 2B as an example, the second wire fixing portions 121a are disposed at a center of the side surfaces 123a and 123b, respectively, where the center is, for example, an intersection of two diagonal lines of the side surfaces 123a and 123b, but is not limited thereto. It should be noted that in the embodiment, the speaker 120a may also be provided with only the second wire fixing portion 121b, and the second wire fixing portion 121a is omitted. In other embodiments, the second wire fixing portion 121b may also be connected to the first wire fixing portion 112 of FIG. 1A through the wire 130, so that the speaker 120a is suspended in the base 110a.

Figure 2C:
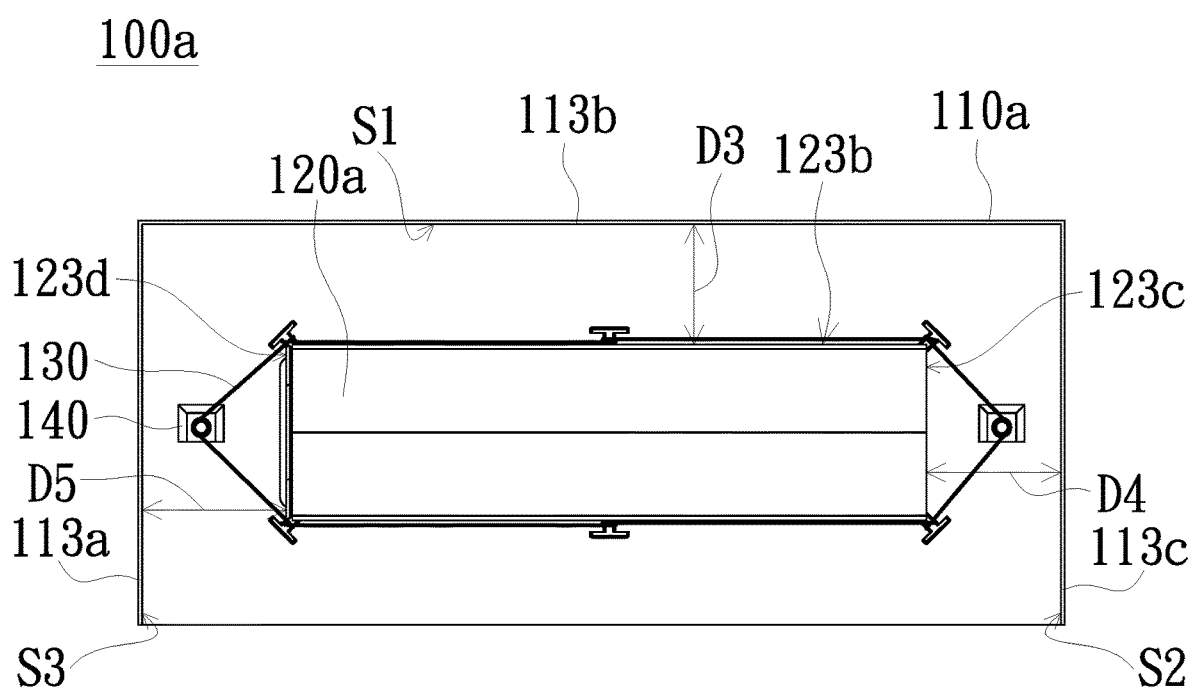
FIG. 2C is a schematic top diagram of the speaker module of FIG. 2A.

FIG. 2C is a schematic top diagram of the speaker module of FIG. 2A. As mentioned above, the speaker 120a would continue to vibrate during operation. In order to prevent the speaker 120a from hitting other components during vibration, the speaker 120a needs to maintain a certain distance from the other components. Therefore, referring to FIG. 2C, the distance between the speaker 120a and any surface of the base 110a may be more than 5 mm. Specifically, the side wall 113b of the base 110a has a surface S1, the side wall 113c has a surface S2, and the side wall 113a has a surface S3. The surface S1 faces the side surface 123b of the speaker 120a, the surface S2 faces the side surface 123c of the speaker 120a, and the surface S3 faces the side surface 123d of the speaker 120a. A distance D3 between the surface S1 and the side surface 123b, a distance D4 between the surface S2 and the side surface 123c, and/or a distance D5 between the surface S3 and the side surface 123d may be 5 mm or more. On the other hand, since the speaker 120a is suspended in the base 110a by the wire 130, when the speaker 120a vibrates, the wire 130 also vibrates accordingly. For the above reasons, the wire 130 may also be separated from the other components by a certain distance (for example, 5 mm or more), so that the wire 130 has sufficient space to vibrate. It should be noted that although the characteristics of the distances D3, D4, and D5 are marked in FIG. 2C, the speaker 120 of FIG. 1A may also be separated from the side walls 113a, 113b, and 113c of the base 110 by more than 5 mm, and the invention is not limited thereto.

Figure 3:
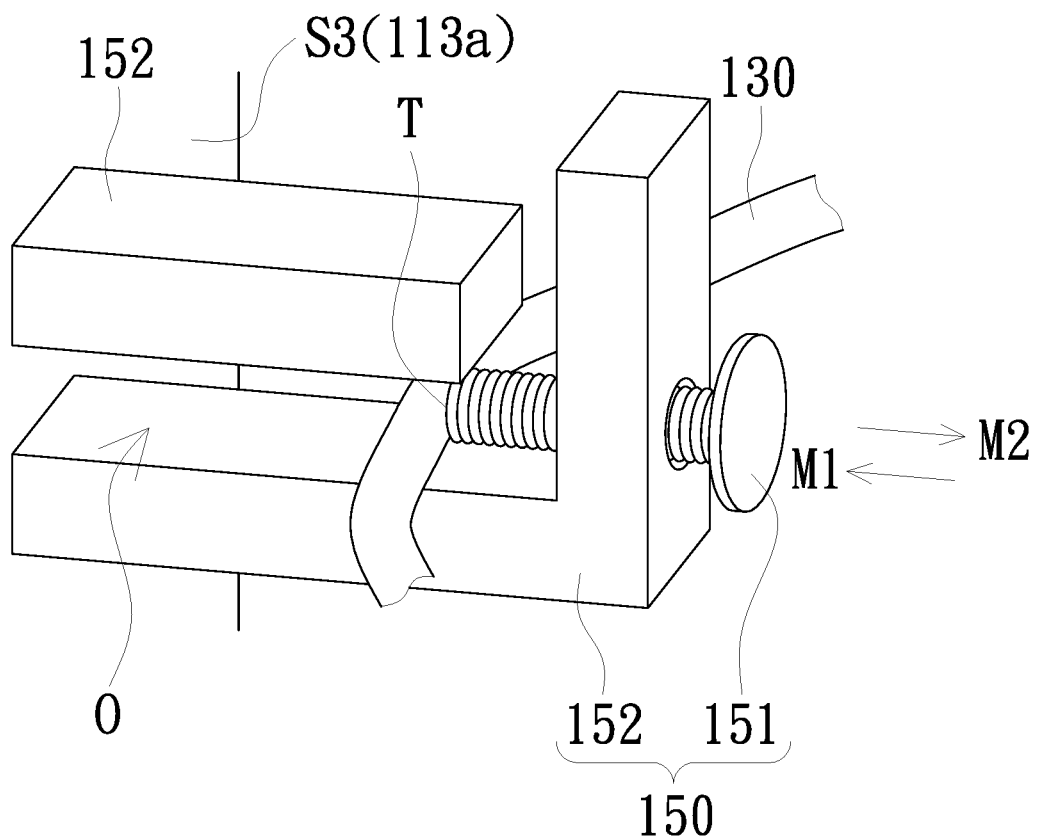
FIG. 3 is a schematic diagram of a tension adjustment member of a speaker module of one embodiment of the invention.

FIG. 3 is a schematic diagram of a tension adjustment member of a speaker module of one embodiment of the invention. The speaker module 100c of the embodiment is similar in structure and advantages to the speaker module 100, and only the main differences in the structure will be described below. It should be understood that a tightness of the wire 130 would affect the suspension effect of the speaker 120 or 120a. Therefore, as shown in FIG. 3, the speaker module of the embodiment further includes a tension adjusting member 150. The tension adjusting member 150 includes an elastic portion 151 and a fixing portion 152, wherein the fixing portion 152 is fixed to the base 110. Further, the fixing portion 152 is fixed to the side wall 113a of the base 110. The fixing portion 152 has a through hole O. The wire 130 passes through the through hole O of the fixing portion 152, and an end T of the elastic portion 151 abuts the wire 130. Specifically, the elastic portion 151 may move toward a first direction M1 or a second direction M2 opposite to the fixing portion 152. Taking FIG. 3 as an example, the tension adjusting member 150 is disposed on the surface S3 of the side wall 113a of the base 110 (the side wall 113a is shown in FIG. 1A). When the elastic portion 151 moves toward the first direction M1, the end T of the elastic portion 151 pushes the wire 130 toward the first direction M1, thereby stretching the wire 130, so that a tension of the wire 130 increases accordingly. On the contrary, when the elastic portion 151 moves toward the second direction M2, the force which the wire 130 is pushed by the end T gradually becomes smaller, so that the wire 130 gradually relaxes, thereby reducing the tension of the wire 130. In the embodiment, the elastic portion 151 is, for example, a screw, but it is not limited thereto. In addition, the tension adjusting member 150 may also be used as a wire fixing portion for fixing the wire 130 by winding, binding or clamping. In other embodiments, the tension adjusting member 150 may also be disposed on the base 110a, or the tension adjusting member 150 may also be disposed on the horn 120 or 120a, but the invention is not limited thereto.

Figure 4:
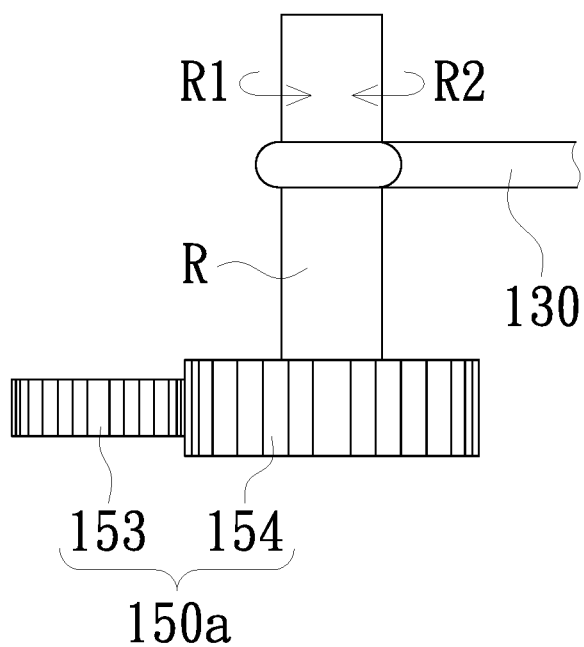
FIG. 4 is a schematic diagram of a tension adjustment member of a speaker module of another embodiment of the invention.

FIG. 4 is a schematic diagram of a tension adjustment member of a speaker module of another embodiment of the invention. The speaker module 100d of the embodiment is similar in structure and advantages to the speaker module 100c, and only the main differences in the structure will be described below. Referring to FIG. 4, the tension adjusting member 150a includes two gears 153, 154 that mesh with each other, and the wire 130 connects one of the two gears 153, 154. For example, the gear 154 is provided with a rotating shaft R. The rotating shaft R may rotate along a first rotating direction R1 or a second rotating direction R2, and the wire 130 may be wound on the rotating shaft R. When the rotating shaft R rotates along the first rotating direction R1, a length of the wire 130 wound on the rotating shaft R would increase accordingly, the wire 130 is stretched and the tension of the wire 130 is also increased accordingly. On the contrary, when the rotating shaft R rotates along the second rotation direction R2, the length of the wire 130 wound on the rotating shaft R would be reduced accordingly, the wire 130 would relax and the tension of the wire 130 would be reduced accordingly. The gear 153 may mesh with the gear 154 to control the rotation amount of the gear 154. In addition, when the gear 154 is not subjected to external force, a gear teeth or a tooth space of the gear 153 may be engaged with a gear teeth or a tooth space of the gear 154, so that the gear 154 may remain stationary when not subjected to external force. It should be noted that, in the embodiment, the wire 130 may also be connected to the rotating shaft R of the gear 154 in other ways. The embodiment does not limit the connection method of the wire 130 and the gear 154.

Figure 5:
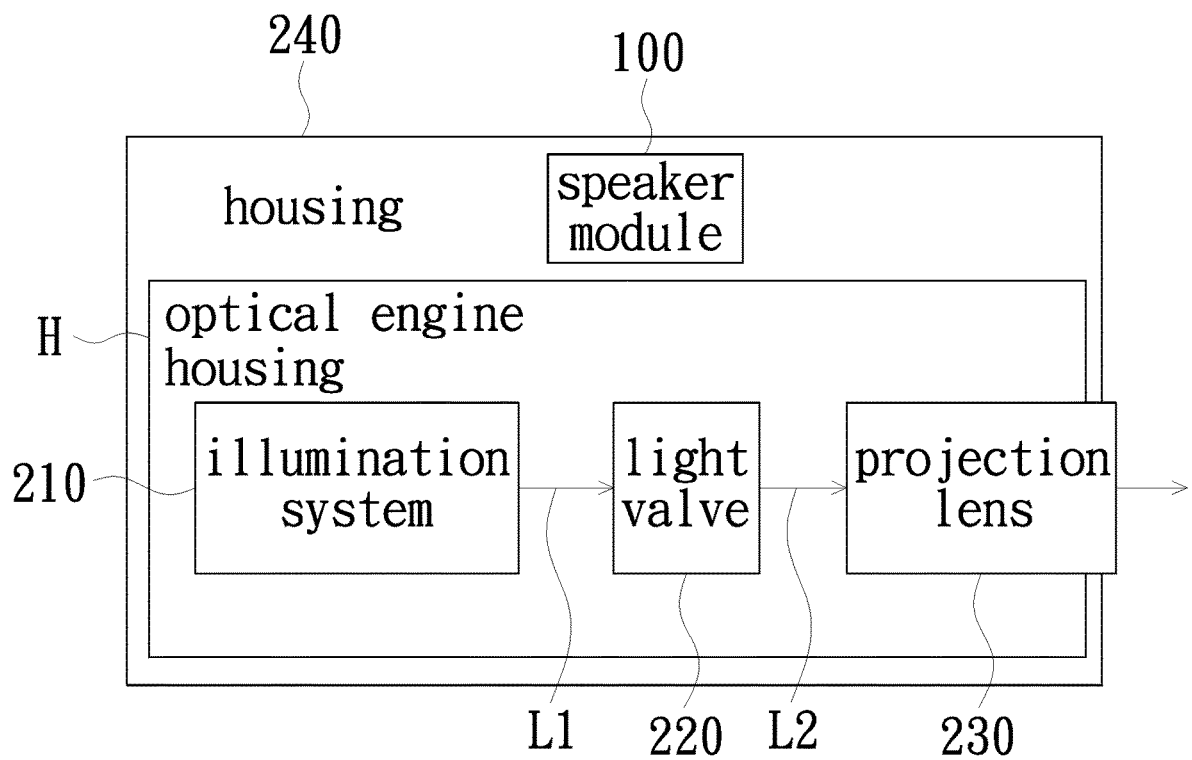
FIG. 5 is a block diagram of a projection device of one embodiment of the invention.

FIG. 5 is a block diagram of a projection device of one embodiment of the invention. Referring to FIG. 5, the projection device 200 includes an illumination system 210, a light valve 220, a projection lens 230, a speaker module 100 and a housing 240. The illumination system 210 is adapted to provide an illumination beam L1. The light valve 220 is disposed on a transmission path of the illumination beam L1 to convert the illumination beam L1 into an image beam L2. The projection lens 230 is disposed on a transmission path of the image beam L2. The speaker module 100 has been described in detail above, so related features will not be repeated here. The housing 240 accommodates the illumination system 210, the light valve 220, the projection lens 230 and the speaker module 100.

In one embodiment, the illumination system 210 may include an excitation light source and a wavelength conversion element. The excitation light source may provide an excitation beam, and the wavelength conversion element is disposed on a transmission path of the excitation beam, thereby converting part of the excitation beam into a conversion beam, which may form the illumination beam L1 with other parts of the excitation beam. In some embodiments, the excitation light source includes, for example, at least one light emitting diode (LED) or laser diode (LD), or includes a plurality of light emitting diodes or laser diodes arranged in a matrix, but the invention is not limited thereto. In other embodiments, the illumination system 210 may also include an ultra-high pressure mercury lamp (UHP lamp) as a light source. In other embodiments, the wavelength conversion element may be omitted.

In one embodiment, the light valve 220 may include, for example, a Digital Micromirror Device (DMD), a Liquid Crystal on Silicon (LCoS), or a Liquid Crystal Display (LCD), but the invention is not limited thereto. In addition, the invention does not limit the quantity of the light valve 220. For example, the projection device of the embodiment may use a structure of a single piece liquid crystal display panel or a three piece liquid crystal display panel, but the invention is not limited thereto.

In one embodiment, the projection lens 230 may include, for example, a combination of one or more optical lenses with the same or different diopters, for example, including biconcave lenses, biconvex lenses, concave-convex lenses, convex-concave lenses, plano-convex lenses, plano-concave lenses, and various combinations thereof. On the other hand, the projection lens 230 may also include a flat optical lens. The invention does not limit the shape and the type of the projection lens 230.

It should be noted that the projection device 200 may be disposed with the speaker module 100, 100a, 100b, 100c, or 100d described above, and the invention is not limited thereto.

In one embodiment, the projection device 200 may further include an optical engine housing H. The optical engine casing H is disposed in the housing 240. Both the illumination system 210 and the light valve 220 are disposed inside the optical engine housing H, and the speaker module 100 may be disposed outside the optical engine housing H. The projection lens 230 may be partially disposed inside the optical engine housing H, that is, at least a portion of the projection lens 230 may be disposed outside the optical engine housing H, and may further be disposed outside the housing 240. In the embodiment, a material of the housing 240 includes metal or plastic, but is not limited thereto. In some embodiments, the base 110 or 110a may be fixedly connected to the optical engine housing H, or formed integrally with the optical engine housing H.

In summary, in the speaker module 100, 100a, 100b, 100c or 100d of the invention, the wires are used to replace screws and rubber dampers to position the speaker, so the manufacturing cost may be effectively reduced. Since the speaker is suspended in the base by the wires, the speaker module has better shock absorption effect, and the speaker is not easy to deform the base, so the tone quality of the speaker module may be improved. The projection device of the invention uses the above-mentioned speaker module, so it has the advantages of low cost and good tone quality.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first wire fixing portion, the second wire fixing portion, the first direction, the second direction, the first rotating direction and the second rotating direction are only used for distinguishing various elements and do not limit the number of the elements.

What is claimed is:

1. A speaker module, comprising:
a base, having a bottom and a first wire fixing portion;
a speaker, disposed in the base and having a second wire fixing portion;
a wire, fixed to the first wire fixing portion and the second wire fixing portion to suspend the speaker in the base, wherein the speaker is separated from the bottom with a distance; and
a tension adjusting member, disposed on the base, wherein the tension adjusting member comprises two gears meshing with each other, and the wire connects one of the two gears.

2. The speaker module according to claim 1, wherein the base further comprises at least one side wall, and the first wire fixing portion is fixed on the bottom or the at least one side wall of the base.

3. The speaker module according to claim 2, wherein the first wire fixing portion is fixed to the opposite two of the at least one side walls of the base.

4. The speaker module according to claim 2, wherein the first wire fixing portion is fixed to a connection between adjacent two of the at least one side walls.

5. The speaker module according to claim 1, wherein the speaker comprises a bottom surface and at least one side surface, the bottom surface faces the bottom of the base, the at least one side surface is connected to an edge of the bottom surface, and the second wire fixing portion is disposed on the at least one of side surface.

6. The speaker module according to claim 5, wherein the second wire fixing portion is disposed at a connection between adjacent two of the at least one side surfaces.

7. The speaker module according to claim 5, wherein the second wire fixing portion is disposed at the middle of one of the at least one side surface.

8. The speaker module according to claim 5, wherein the speaker comprises at least two second wire fixing portions, the at least two second wire fixing portions are respectively disposed on the opposite two of the at least one side surface.

9. The speaker module according to claim 5, wherein the speaker further comprises a top surface opposite to the bottom surface, a distance between the second wire fixing portion and the bottom surface of the speaker is equal to a distance between the at least two second wire fixing portions and the top surface of the speaker.

10. The speaker module according to claim 1, wherein a distance between the speaker and any surface of the base is more than 5 mm.

11. A projection device, comprising:
an illumination system, adapted to provide an illumination beam;
a light valve, disposed on a transmission path of the illumination beam to convert the illumination beam into an image beam;
a projection lens, disposed on a transmission path of the image beam;
a speaker module, comprising:
a base, having a bottom and a first wire fixing portion;
a speaker, disposed in the base and having a second wire fixing portion; and
a wire, fixed to the first wire fixing portion and the second wire fixing portion to suspend the speaker in the base, wherein the speaker is separated from the bottom with a distance; and
a housing, accommodating the illumination system, the light valve, the projection lens and the speaker module;
wherein the speaker module further comprises a tension adjusting member disposed on the base, the tension adjusting member comprises two gears meshing with each other, and the wire connects one of the two gears.

12. The projection device according to claim 11, wherein the base further comprises at least one side wall, and the first wire fixing portion is fixed on the bottom or the at least one side wall of the base.

13. The projection device according to claim 12, wherein the first wire fixing portion is fixed to the opposite two of the at least one side walls of the base.

14. The projection device according to claim 12, wherein the first wire fixing portion is fixed to a connection between adjacent two of the at least one side walls.

15. The projection device according to claim 11, wherein the speaker comprises a bottom surface and at least one side surface, the bottom surface faces the bottom of the base, the at least one side surface is connected to an edge of the bottom surface, and the second wire fixing portion is disposed on the at least one of side surface.

16. The projection device according to claim 15, wherein the second wire fixing portion is disposed at a connection between adjacent two of the at least one side surfaces.

17. The projection device according to claim 15, wherein the second wire fixing portion is disposed at the middle of one of the at least one side surface.

18. The projection device according to claim 15, wherein the speaker comprises at least two second wire fixing portions, the at least two second wire fixing portions are respectively disposed on the opposite two of the at least one side surface.

19. The projection device according to claim 15, wherein the speaker further comprises a top surface opposite to the bottom surface, a distance between the second wire fixing portion and the bottom surface of the speaker is equal to a distance between the at least two second wire fixing portions and the top surface of the speaker.

20. The projection device according to claim 11, wherein a distance between the speaker and any surface of the base is more than 5 mm.

\* \* \* \* \*